(12) United States Patent
Sanchez et al.

(10) Patent No.: US 9,088,237 B2
(45) Date of Patent: *Jul. 21, 2015

(54) CIRCUIT AND METHOD FOR CALIBRATION OF SENSORLESS CONTROL OF A PERMANENT MAGNET BRUSHLESS MOTOR DURING START-UP

(71) Applicant: Cirrus Logic, Inc., Austin, TX (US)

(72) Inventors: Stephen James Sanchez, Tucson, AZ (US); Marc John Kobayashi, Oro Valley, AZ (US); Branislav Pjetar, Novi Sad (RS); John L. Melanson, Austin, TX (US)

(73) Assignee: Cirrus Logic, Inc., Austin, TX (US)

(*) Notice: Subject to any disclaimer, the term of this patent is extended or adjusted under 35 U.S.C. 154(b) by 211 days.

This patent is subject to a terminal disclaimer.

(21) Appl. No.: 13/827,848

(22) Filed: Mar. 14, 2013

(65) Prior Publication Data
US 2013/0314017 A1    Nov. 28, 2013

Related U.S. Application Data

(63) Continuation-in-part of application No. 13/800,327, filed on Mar. 13, 2013.

(60) Provisional application No. 61/651,736, filed on May 25, 2012, provisional application No. 61/692,551, filed on Aug. 23, 2012.

(51) Int. Cl.
*H02P 6/18* (2006.01)

(52) U.S. Cl.
CPC ................. *H02P 6/183* (2013.01); *H02P 6/182* (2013.01)

(58) Field of Classification Search
CPC ........ H02P 6/182; H02P 6/185; B23Q 35/123
USPC ............... 318/400.06, 400.33, 578, 599, 676, 318/587, 657
See application file for complete search history.

(56) References Cited

U.S. PATENT DOCUMENTS

| | | | |
|---|---|---|---|
| 6,885,163 | B2 | 4/2005 | Heidrich |
| 6,982,534 | B2 | 1/2006 | Hahn et al. |

(Continued)

OTHER PUBLICATIONS

Wang, et al.,"A Position Detection Strategy for Sensorless Surface Mounted Permanent Magnet Motors at Low Speed Using Transient Finite-Element Analysis" IEEE Transactions on Magnetics, vol. 48 No. 2, Feb. 2012, pp. 1003-1006.

(Continued)

*Primary Examiner* — Karen Masih
(74) *Attorney, Agent, or Firm* — Hayes Soloway PC

(57) ABSTRACT

A system for controlling motor switching in a sensorless BLDC having a stator with three stator windings and a permanent magnet rotor. The system includes a controller unit comprising a control signal generator, a memory device, a processing unit, a signal acquisition device, and an analog-to-digital converter. A power stage controlled by the controller unit has a plurality of switches and drives two windings of the three stator windings with a pulse width modulation signal and leaves one stator of the three stator windings undriven. The processing unit acquires a demodulated measured voltage on the undriven winding. The processing unit calculates a threshold at which the power stage will change which two windings of the three stator windings are driven when the demodulated measured voltage surpasses the threshold.

24 Claims, 9 Drawing Sheets

(56) References Cited

U.S. PATENT DOCUMENTS

| | | | |
|---|---|---|---|
| 7,042,180 | B2 | 5/2006 | Terry et al. |
| 7,122,980 | B2 | 10/2006 | Kuroshima et al. |
| 7,274,161 | B2 | 9/2007 | Mori et al. |
| 7,486,037 | B2 | 2/2009 | Noh |
| 7,489,097 | B2 | 2/2009 | Fu et al. |
| 7,944,163 | B2 | 5/2011 | Okumura |
| 8,018,188 | B2 | 9/2011 | Schwarzkopf et al. |
| 8,040,095 | B2 | 10/2011 | Berto |
| 8,054,024 | B2 | 11/2011 | Hayashi et al. |
| 2010/0060217 | A1 | 3/2010 | Ikeda et al. |
| 2010/0194329 | A1 | 8/2010 | Lu et al. |
| 2010/0207562 | A1 | 8/2010 | Spirk et al. |
| 2014/0312796 | A1* | 10/2014 | Sauerlander et al. ......... 315/210 |

OTHER PUBLICATIONS

Johnson et al, "Review of Sensorless Methods for Brushless DC", Copyright 1999 IEEE, pp. 143-150.

Ogasawara et al, "An Approach to Position Sensorless Drive for Brushless DC Motors", Copyright 1990 IEEE, pp. 443-447.

Holtz, "Initial Rotor Polarity Detection and Sensorless Control of PM Synchronous Machines", Copyright 2006 IEEE, pp. 2040-2047.

Chang et al, "A New Sensorless Starting Method for Brushless DC Motors without Reversing Rotation", Copyright 2007 IEEE, pp. 619-624.

Personn et al, "A New Standstill Position Detection Technique for Nonsalient Permanent-Magnet Synchronous Motors Using the Magnetic Anisotropy Method", Copyright Feb. 2007 IEEE Transaction on Magnetics, col. 43, No. 2, pp. 554-560.

Nakashima et al, "Sensorless Initial Rotor Position Estimation of Surface Permanent-Magnet Synchronous Motor", Copyright Nov./Dec. 2000, IEEE Transaction on Industry Applications, vol. 36, No. 6, pp. 1598.

Tanaka et al, "Initial Rotor Position Estimation for Surface Permanent Magnet Synchronous Motor", Copyright 2001 IEEE, pp. 2592.

Tursini et al, "Initial Rotor Position Estimation Method for PM Motors", Copyright Nov./Dec. 2003, IEEE Transactions on Industry Applications, vol. 39 No. 6, pp. 1630-1640.

Lee et al, "A New Starting Method of BLDC Motors Without Position Sensor", Copyright Nov./Dec. 2006 IEEE Transactions of Industry Applications, vol. 42 No. 6, pp. 1532.

Lee et al, "A New Starting Method of BLDC Motors without Position Sensor", Copyright 2004 IEEE, pp. 2397-2402.

Ha et al, "Sensorless Field-Orientation Control of an Induction Machine by High-Frequency Signal Injection", Copyright Jan./Feb. 1999, IEEE Transactions on Industry Applications, vol. 35 No. 1, pp. 45-51.

Jeong et al, "Initial Rotor Position Estimation of an Interior Permanent-Magnet Synchronous Machine Using Carrier-Frequency Injection Methods", Copyright Jan./Feb. 2005, IEEE Transactions on Industry Applications, vol. 41 No. 1, pp. 38-45.

Wijenayake et al, "Modeling and Analysis of Permanent Magnet Synchronous Motor by Taking Saturation and Core Loss into Account", Copyright 1997 IEEE, pp. 530-534.

Schmidt et al, "Initial Rotor Angle Detection of a Non-Salient Pole Permanent Magnet Synchronous Machine", Copyright Oct. 1997, IEEE Industry Application Society Annual Meeting, pp. 459-463.

Jang et al, "Position Detection and Start-up Algorithm of a Rotor in a Sensorless BLDC Motor Utilising Inductance Variation". IEE Proc.-Electr. Power Appl., vol. 149, No. 2, Mar. 2002.

Nakashima et al, "Sensorless Initial Rotor Position Estimation of Surface Permanent Magnet Synchronous Motor", Copyright 1999 IEEE, pp. 525-527.

Sugawata et al, "A Novel and Simple Initial Rotor Position Detecting Method for PMSMs", Copyright 2005 IEEE PEDS, pp. 612-617.

Li et al, "Modeling of Cross-Coupling Magnetic Saturation in Signal-Injection-Based Sensorless Control of Permanent-Magnet Brushless AC Motors", Copyright Jun. 2007, IEEE Transactions on Magnetics, vol. 43 No. 6, pp. 2552-2554.

Consoli et al, "Sensorless Control of PM Synchronous Motors at Zero Speed", Copyright 1999 IEEE, pp. 1033-1040.

Ichikawa et al, "Sensorless Control of Permanent-Magnet Synchronous Motors Using Online Parameter Identification Based on System Identification Theory", Copyright Apr. 2006, IEEE Transactions on Industrial Electronics, vol. 53 No. 2, pp. 363-372.

Scaglione et al, "PM Motor Sensorless Position Detection based on Iron B-H Local Hysteresis" (Switzerland 2000), 6 pages.

Hung et al, "Fuzzy Gain Scheduling PI Controller for a Sensorless Four Switch Three Phase BLDC Motor", Copyright 2010 IEEE, pp. 420-424.

* cited by examiner

CIRCUIT AND METHOD FOR CALIBRATION OF SENSORLESS CONTROL OF A PERMANENT MAGNET BRUSHLESS MOTOR DURING START-UP

CROSS-REFERENCE

This application is a Continuation in Part to U.S. application entitled "Circuit and Method for Sensorless Control of a Permanent Magnet Brushless Motor During Start-up," having Ser. No. 13/800,327 filed Mar. 13, 2013 and claims the benefit of U.S. Provisional Application entitled, "Circuit and Method for Sensorless Control of a Brushless Motor During Start-up," having Ser. No. 61/651,736, filed May 25, 2012, and U.S. Provisional Application entitled, "Method for Estimation of Current Influence on Motor Voltage Response," having Ser. No. 61/692,551, filed Aug. 23, 2012, which is entirely incorporated herein by reference.

FIELD

The present disclosure is generally related to motor controllers, and more particularly is related to a system and method for calibration of a sensorless control of a permanent magnet brushless motor during start-up.

BACKGROUND

Sensored brushless motor technology is well-known and is useful for minimal flaw control at low speeds and reliable rotation. A sensored system has one or more sensors that continuously communicate with a motor controller, indicated to it what position the rotor is in, how fast it is turning, and whether it is going forward or reverse. Sensors in a sensored system increase cost and provide additional pieces that can break or wear down, adding durability and reliability issues. Sensorless systems can read pulses of current in the power connections to determine rotation and speed. capable of controlling motors at higher speeds (e.g., revolutions per minute ("RPM")), but may suffer "jitters" under a load at very low starting speeds, resulting in a performance inferior to sensored brushless motors.

Jitter is a phenomenon that occurs with sensorless brushless motor systems at initial starting speed and generally no longer exists after the motor has gained sufficient speed. Jitter comes about because at low or zero speed, the sensorless algorithm does not have enough information to decide which windings to energize and in what sequence. One common solution for starting a sensorless system is to energize one to winding pair to lock the rotor at a known position. The motor windings are then commutated at a pre-defined rate and PWM duty cycle until the rotor reaches a speed sufficiently high for the sensorless control to engage. However, even this solution will cause jitter during startup, particularly if there are time varying loads. Jitter can be decreased or made imperceptible for loads with minimal initial torque or predictable initial torque. However, some motor application/use situations (such as starting an electric motor bike moving uphill) demand significant torque for initiation, and the initial torque is highly unpredictable. Use of sensorless brushless motor systems is sometimes discouraged for low-speed high-torque maneuvers, like rock-crawling or intricate and detailed track racing of an electric motor vehicle/bike, because in such difficult situations, significant jittering may occur and can lead to premature motor burnout.

FIG. 1 is a block diagram of a motor control system 10 in a three-phase power stage, as is known in the prior art. Many three-phase motor control systems 10 include a controller having a control signal generator 12, a gate driver 14, and a power stage 16. In case of sensorless control, feedback circuits are also included, specifically a detection network 18 and a current sensing circuit 20, which utilizes a sense resistor $R_{SENSE}$. In general, a goal of sensorless control is to detect a motor response to an applied pulse width modulated (PWM) source voltage $V_{pwr}$ to identify rotor position and movement.

Similarly, a current sense circuit 20 may be used to detect the magnitude and direction of motor current across driven windings. Low side shunt monitoring is used regularly. An often used configuration for low side monitoring is shown in FIG. 1. One skilled in the art can easily adopt alternative current sensing techniques such as monitoring phase current in each inverter branch including high-side monitoring and this alternative technique is known to those having ordinary skill in the art.

The control signal generator 12 is often powered from a low voltage source. As a result, a function of the gate driver 14 includes shifting the low voltage control signals to levels that match input requirements of the power stage 16. The power stage 16 includes semiconductor switching devices. MOSFETs are shown in FIG. 1, but other devices such as insulated-gate bipolar transistors (IGBTs) may be used. The control signal can be made to generate trapezoidal (a.k.a. block or 6 step commutation) or sinusoidal drive from the power source $V_{pwr}$. Pulse width modulation is typically used with trapezoidal drive in brushless DC (BLDC) motor control. Systems requiring lower audible noise or lower torque ripple benefit from sinusoidal drive.

Those skilled in the art with respect to PWM drive techniques understand a variety of modes to generate trapezoidal, sinusoidal, or other control. The motor response to a PWM drive can be detected via voltage on the motor phases and/or phase current(s).

As shown in FIG. 1 for a brushless DC motor control, the power stage 16 is driven such that current flows into a first motor phase (for example, phase U) and exits a second motor phase (for example, phase V). The rotor (not shown) position within the motor 30 dictates which phase pair to drive to attempt to achieve full torque and smooth (jitter-free) rotation of the rotor. The feedback controls are used to deduce rotor position.

FIG. 2 is an illustration of a wye-connected motor 30, as is known in the prior art. The wye-connected motor 30 in this illustration has a single-pole pair permanent magnet rotor 32 positioned such that its south pole 34 is proximate to the winding of the U-phase 36. Under these conditions, it is obvious to one skilled in the art that the W-phase 38 and the V-phase 40 are the appropriate phase pair to drive in order to initiate rotation of the rotor 32. The polarity of the permanent magnet rotor 32 determines the direction of current flow through the phase. Hence, the power stage 16 connects the W-phase 38 to $V_{pwr}$ and the V-phase 40 to ground 24 resulting in current flow into the W-phase 38 and exiting the V-phase 40, as represented with the current arrows. A net effect of current flowing through coils W-phase 38 and V-phase 40 as shown in FIG. 2 is the formation of an electromagnet having a north pole at the W-phase 38 and a south pole at V-phase 40. This electromagnet produces a repulsive force between permanent magnet N-pole 42 and the electromagnet N-pole formed at the W-phase 38 and an attractive force between permanent magnet N-pole 42 and the electromagnet S-pole formed at the V-phase 38.

As N- and S-poles are attracted to each other, if the electromagnet persisted long enough in this current flow configuration, the resulting torque will move the permanent magnet N-pole 42 to a position shortly after the V-phase 40 and the permanent magnet S-pole 34 to a position shortly before the W-phase and rotation of the permanent magnet rotor 32 would stop. To perpetuate rotation of the permanent magnet rotor 32, the power stage 16 must commutate to a new phase pair. The optimum commutation point is a function of the rotor position relative to the coil of the undriven phase (the phase not driven by $V_{pwr}$). In FIG. 2, the U-phase 36 is the undriven phase. Ideally, the rotor angle would span −30° to +30° with respect to alignment with the coil of the undriven phase. As this 60° span is one sixth of one electrical revolution, it is commonly referred to as one sextant.

FIG. 3 is a 6-step commutation process further defined by Table 1, as is known in the prior art. Given the conditions illustrated in FIG. 2, a high level description of the sequence of steps commonly referred to as 6-step commutation process is outlined in is Table 1 and further illustrated in FIG. 3.

TABLE 1

Six-step commutation sequence for a wye-connected motor shown in FIG. 2

| Sequence Step | Driven Phase Pair | N pole position relative to phases | Rotor Angle |
|---|---|---|---|
| 0 | WV | W + 30° to V − 30° | 1.25-1.75 |
| 1 | WU | V − 30° to V + 30° | 1.75-2.25 |
| 2 | VU | V + 30° to U − 30° | 2.25-2.75 |
| 3 | VW | U − 30° to U + 30° | 2.75-0.25 |
| 4 | UW | U + 30° to W − 30° | 0.25-0.75 |
| 5 | UV | W − 30° to W + 30° | 0.75-1.25 |

The 6-step commutation sequence results in one electrical revolution. Given this simplified example, it is understood that a properly driven permanent magnet rotor will be driven one mechanical revolution when this six-step process is complete. An increase in number of pole pair results in an equivalent increase in the number of electrical revolutions per mechanical revolution. Comparing Table 1 and FIG. 2, it is understood that FIG. 2 illustrates Sequence Step 0 with the permanent magnet N-pole 42 pushed from the W-phase 38 and pulled by the attraction to the V-phase 40. When the permanent magnet S-pole 34 reaches the U+30° position, the power stage 16 commutates to Sequence Step 1 driving current from the W-phase 38 to the U-phase 36 causing the U-phase to become the electromagnetic S-pole. Thus, the U-phase 36 repels or pushes the permanent magnet S-pole 34 and the W-phase 38 attracts the S-pole, continuing the clockwise motion of the permanent magnet rotor 32.

Others have developed solutions to sensorless control of a brushless motor is during start-up as they relate to spindle motors for disk drives, compact disk ("CD") drives, and digital video disk/digital versatile disk ("DVD") drives. However, CDs and DVDs do not offer significant or varying resistance to rotor rotation during start-up. Because the initial torque is predictable, performance parameters can be pre-programmed significantly. Other motors, such as those for electric scooters, can have varying resistance applied to the motor. For instance, the torque placed on a motor for an electric scooter may be dependent on the amount of weight on the electric scooter and whether the scooter is facing an incline, a decline, or on a level surface. Ideally, the motor would be calibrated at the time of start-up to allow the motor to properly compensate for operating conditions.

Thus, a heretofore unaddressed need exists in the industry to address the aforementioned deficiencies and inadequacies.

SUMMARY

Embodiments of the present disclosure provide a system and method for calibrating a motor controller to identify commutation levels effectively. Briefly described, in architecture, one embodiment of the system, among others, can be implemented as to follows. The system controls motor switching in a sensorless BLDG having a stator with three stator windings and a permanent magnet rotor. The system includes a controller unit comprising a control signal generator, a memory device, a processing unit, a signal acquisition device, and an analog-to-digital converter. A power stage controlled by the controller unit has a plurality of switches and drives two windings of the three stator windings with a pulse width modulation signal and leaves one stator of the three stator windings undriven. The processing unit acquires a demodulated measured voltage on the undriven winding. The processing unit calculates a threshold at which the power stage will change which two windings of the three stator windings are driven when the demodulated measured voltage surpasses the threshold.

The present disclosure can also be viewed as providing a method for calibrating a motor controller to identify commutation levels in a sensorless BLDC motor effectively. In this regard, one embodiment of such a method, among others, can be broadly summarized by the following steps: obtaining a demodulated measured voltage on an undriven winding; and setting a threshold at which the motor will switch which two windings of a set of three windings are driven when the demodulated measured voltage exceeds the threshold.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale. Instead emphasis is being placed upon illustrating clearly the principles of the present disclosure. Moreover, in the drawings, like reference numerals designate corresponding parts throughout the several views.

DETAILED DESCRIPTION

Figure 4:
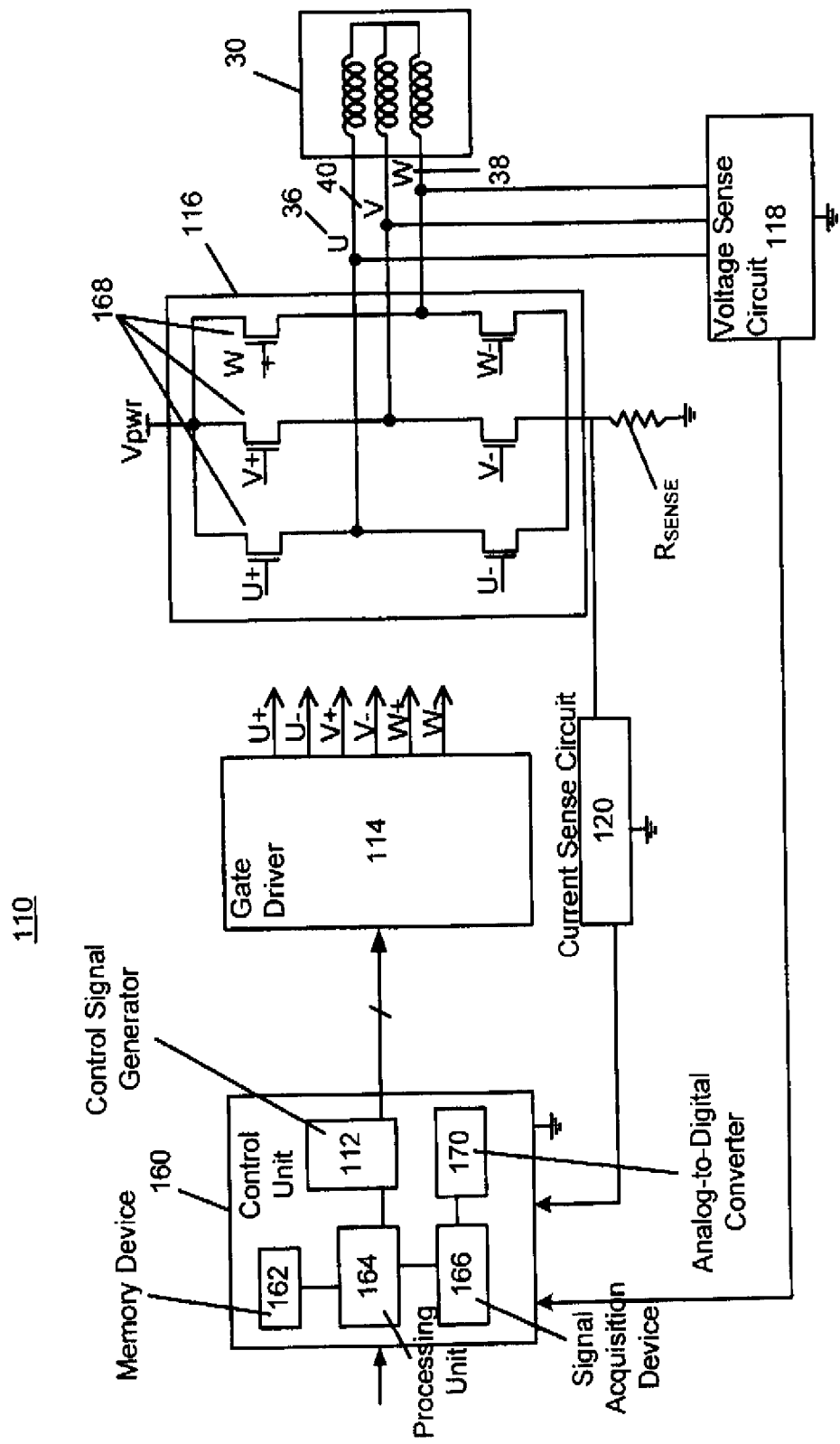
FIG. 4 is a block diagram of a motor control system in a three-phase power stage, in accordance with an exemplary embodiment of the present disclosure.

FIG. 4 is a block diagram of a motor control system 110 for a three-phase power stage 116 for a sensorless, brushless permanent magnet DC motor 30, in accordance with an exemplary embodiment of the present disclosure. The motor control system 110 includes a controller unit 160 having a control signal generator 112, a memory device 162, a processing unit 164, a signal acquisition device 166, and an analog-to-digital converter 170. The control signal generator 112 feeds six inputs into a gate driver 114. The gate driver 114, which may be powered by an independent power source (not illustrated), controls six MOSFET switches 168 in the power stage 116. Manipulation of the switches determines current flow from the power source $V_{pwr}$ through the stator windings 36, 38, 40 in the motor 30.

The voltage sense circuit 118 and current sense circuit 120 are used for closed loop control of the motor. The power stage 116 has 6 switches grouped in pairs. Each switch pair is configured as a half bridge. Each switch has a control input. The outputs of power stage 116 feed into the 3-phase BLDC motor windings U 36, V 40, W 38. The power stage 116 is supplied by a voltage source $V_{pwr}$ which supplies a pulse width modulation signal to the windings U 36, V 40, W 38. The current return path for the voltage source $V_{pwr}$ is through ground via current sense resistor $R_{SENSE}$. The power stage 116 for a trapezoidally controlled pulse width modulated brushless DC motor 30 typically energizes two motor windings of the set of three windings 36, 38, 40 at a time.

A voltage signal is available at the undriven phase. This voltage signal can be used to generate a commutation signal by demodulating the undriven phase voltage synchronously with the PWM switching rate. The commutation signal, when a near-zero drive current is present, has a periodicity of ½ electrical revolutions. The shape of this commutation signal is related to the action of the permanent magnet rotor 32 on the stator windings 36, 38, 40. Demodulation can be performed by simply taking the difference in voltage between the undriven phase and the switching in two different driven states of the PWM. When a materially-greater-than-zero current is driven into the active pair of terminals, the signal has an added component with a periodicity of a full electrical cycle.

Figure 1:
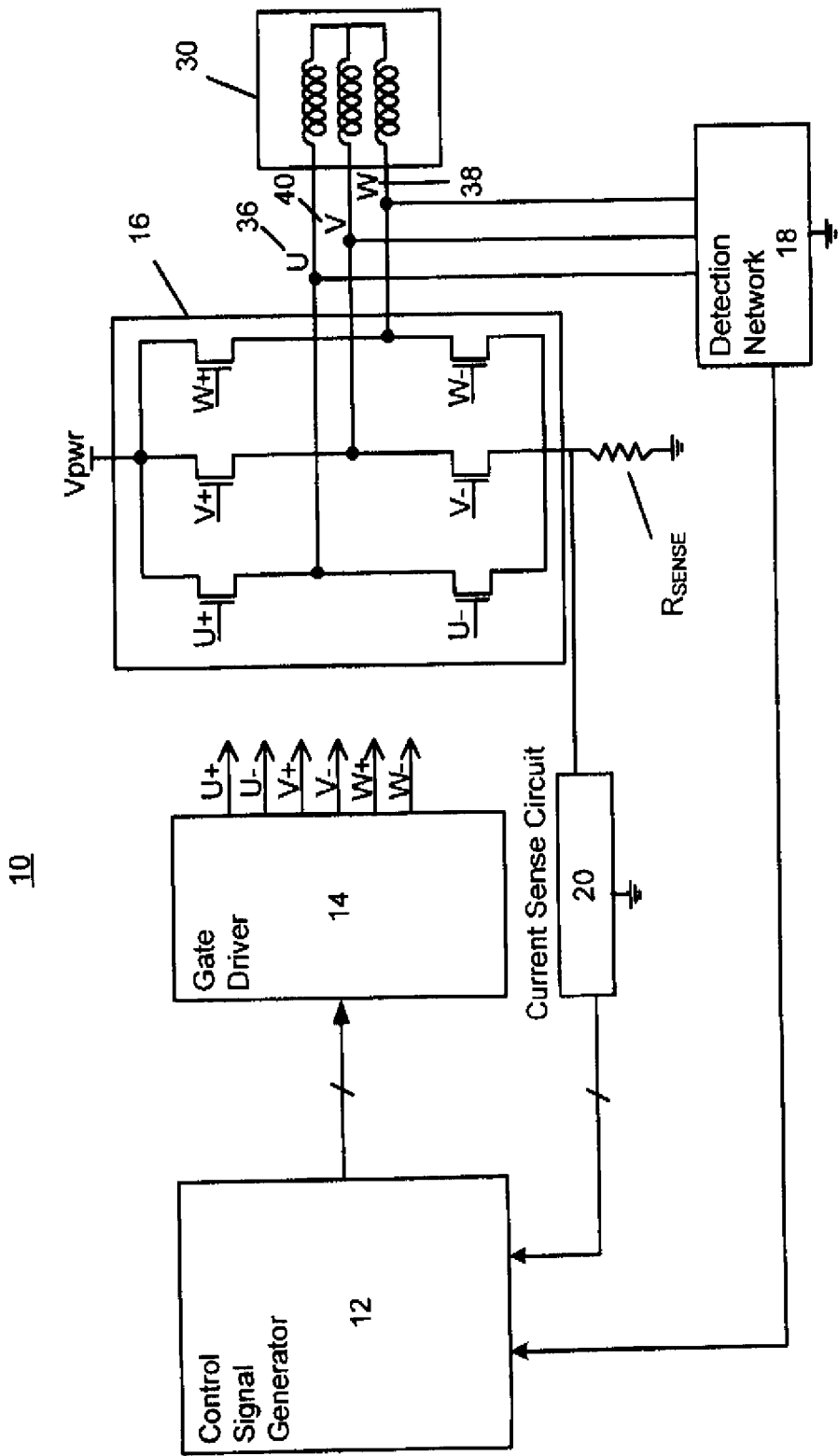
FIG. 1 is a block diagram of a motor control system in a three-phase power stage, as is known in the prior art.
Figure 2:
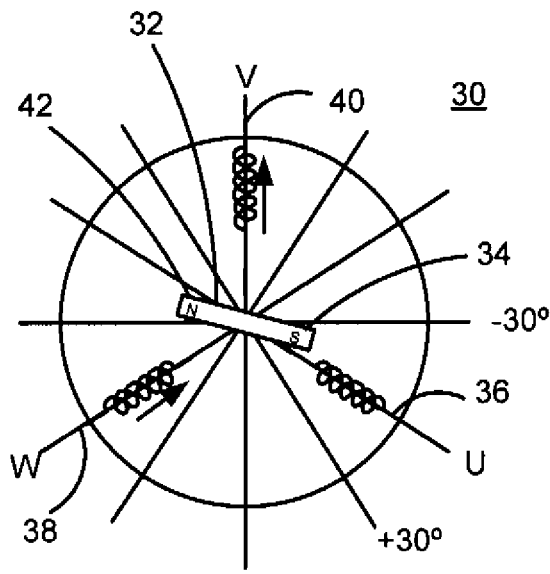
FIG. 2 is an illustration of a wye-connected motor, as is known in the prior art.
Figure 3:
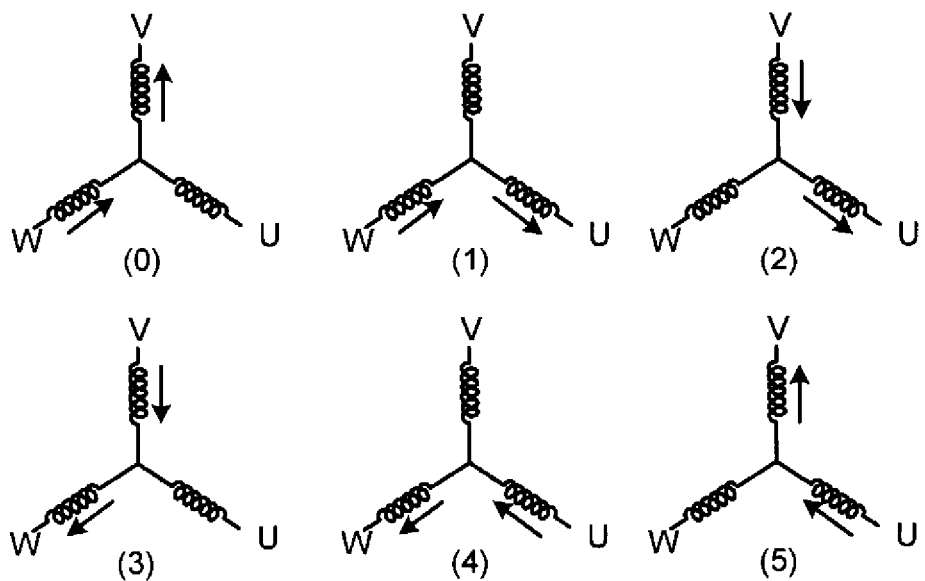
FIG. 3 is a 6-step commutation process further defined by Table 1, as is known in the prior art.
Figure 5:
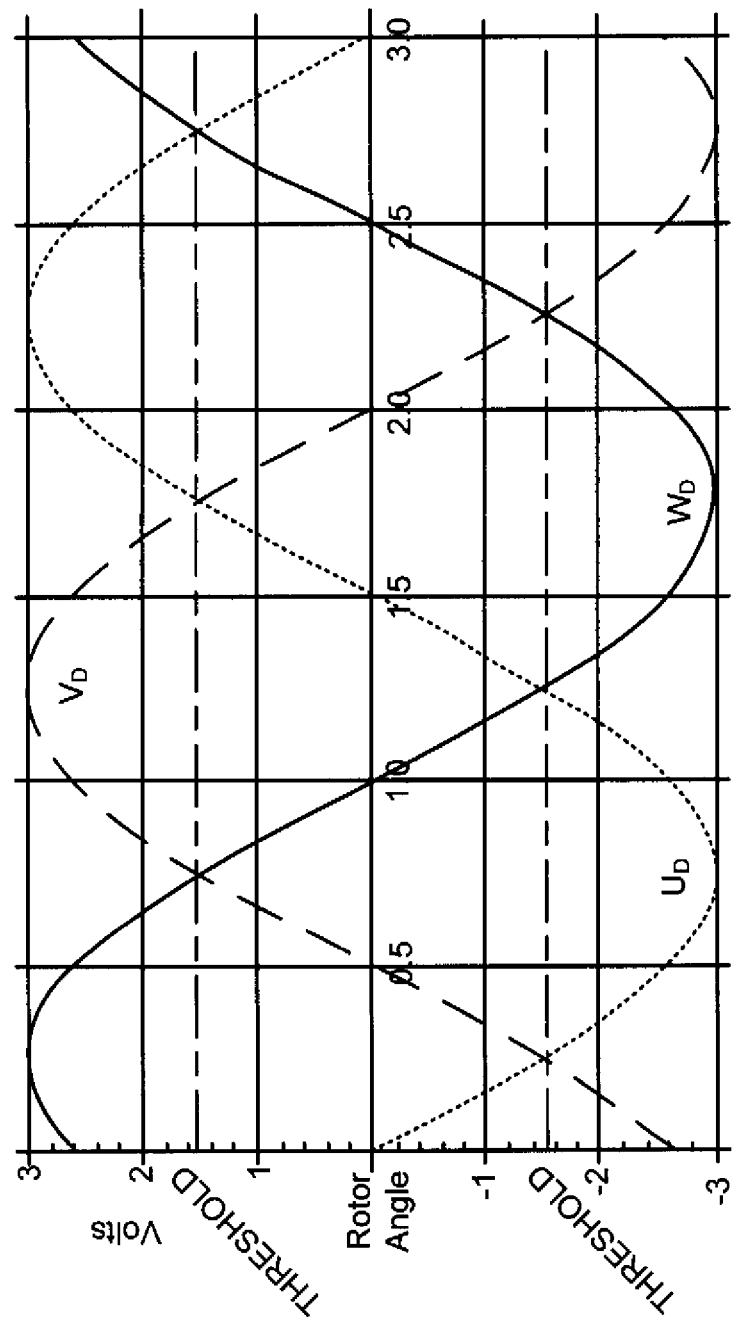
FIG. 5 is an illustration of demodulated signals representing motor phases illustrated in FIG. 2.

FIG. 5 is an illustration of demodulated undriven phase signals representing motor phases illustrated in FIG. 2 and FIG. 3. The subscript D indicates the signal is from a demodulated undriven winding. Here, the undriven phase signals are illustrated for a ½ electrical cycle superimposed upon each other relative to rotor angle. The proper commutation time can be determined by monitoring the undriven phase signal, derived from the demodulated undriven phase signal, and commutating at a value that is a function of the motor current. As the current increases, a comparison value will change, but FIG. 5 is representative of a near-zero current through the driven windings.

As illustrated in FIG. 5, the dotted line $U_p$ represents the demodulated signal produced when the U-phase 36 is disconnected during commutation sequence step 0, and the WV phases 38, 40 are driven with a PWM wave from $V_{pwr}$. This drive combination is the connection that generates the most torque from the rotation position 1.25 to the 1.75 point on the x-axis, which is the sextant position If the motor is being driven with torque pushing to the right, when 1.75 point is reached, the motor is rotating in the proper direction, and commutation from WV phases to WU phases should occur at the 1.75 point. Likewise, if the rotor is rotating counterclockwise while being electrically driven clockwise, such as starting an electric scooter on a hill, $U_D$ has negative slope between 1.25 and 1.75. If the 1.25 point is reached, the prior commutation phase UV or commutation sequence step 5 should be switched in. These points are associated with the demodulated signal $U_D$, reaching approximately 1.5 or −1.5 volts for forward or reverse commutation respectively, illustrated as THRESHOLD in FIG. 5. When 1.75 on the x-axis is reached, upon commutating to WU phases, the demodulated signal associated with the V-phase 40, i.e. $V_D$, will then be generated. If 1.25 is reached (forced in reverse), the demodulated signal associated with the W phase, i.e. $W_D$, will then be generated.

If the commutation signal component from the permanent magnets is dominant, determining the time for commutation is straightforward. The commutation signal from the undriven phase is derived, and when determined values are reached, the motor is advanced to the next or prior phase. The prior phase advance is important, as the load may be rotating in the direction opposite to the desired rotation upon start. For maximum torque, it is important that the commutation levels be relatively accurate.

When the required starting torque is high, a materially-greater-than-zero current is needed through the driven windings to generate the high torque. The commutation breakpoint is harder to determine from the undriven phase signal when the driven winding current is high. The commutation signal transforms substantively with respect to rotational position when the current has surpassed a near-zero level.

Figure 6:
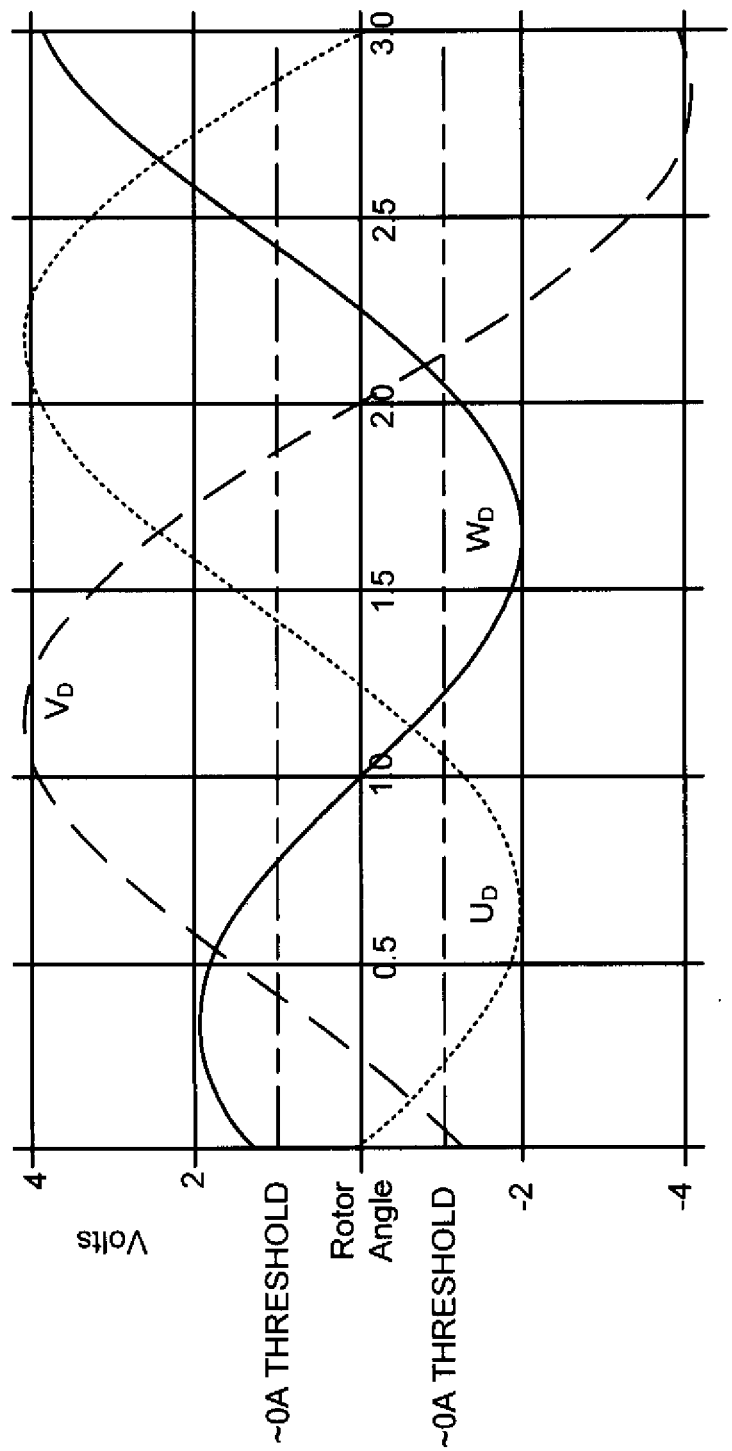
FIG. 6 is an illustration of demodulated signals representing motor phases illustrated in FIG. 2 under the influence of high torque and current.

FIG. 6 is an illustration of demodulated signals representing motor phases illustrated in FIG. 2 under the influence of high torque and current. The proper values for the demodulated undriven winding ($U_D$) signal at the previously identified commutation breakpoints (when the rotor angle is 1.25 and 1.75) are 0V and 3V. Thus, if the motor controller operated with a threshold of −1.5V and 1.5V for commutation, as was shown in FIG. 5, the motor would not be able to obtain the maximum available torque that is acquired with proper motor commutation. In the forward motion case, the commutation will be too early, causing a transfer to a commutation sequence step that will provide less torque. In the case the motor is rolling backward, the commutation may be too late to achieve high torque from the previous commutation step. Further, at slightly higher currents, the result may be failure to commutate altogether leading the controller to errantly attempt to drive the motor in the wrong direction. The effect of current on the demodulated signal may be different for even and odd sextants (commutation sequence steps 0, 2, and 4 as opposed to 1, 3, and 5). Motor characteristics indicate the portion of the demodulated signal associated with even sextants varies proportionally with current and the portion of demodulated signal to associated with odd sextants varies inversely with current.

Figure 7:
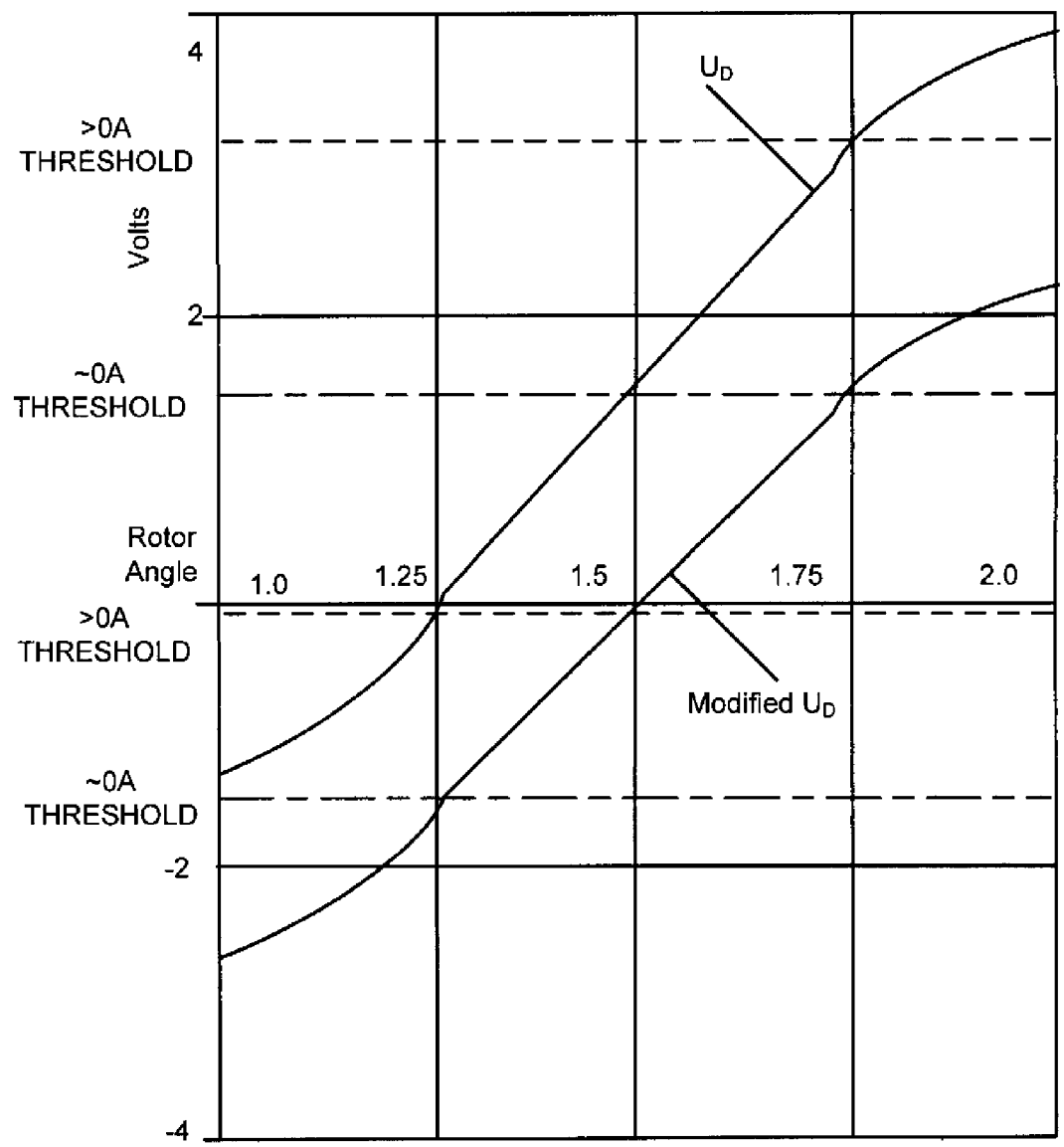
FIG. 7 is an illustration of a portion of the demodulated undriven voltage on the U-phase shown in FIG. 6, in accordance with an exemplary embodiment of the present disclosure.

FIG. 7 is an illustration of a portion of the demodulated undriven voltage on the U-phase shown in FIG. 6, in accordance with an exemplary embodiment of the present disclosure. The ideal commutation points for $U_D$ for the motor configuration described herein are when the rotor angle is at 1.25 and 1.75. As shown in FIG. 2, this rotor is position, relative to the driven windings, generates the most torque in the clockwise direction. However, without a sensor to define the rotor position, the demodulated undriven voltage and the threshold are used to identify when the rotor is at 1.25 and 1.75. At near zero amperes over the driven windings, the thresholds of −1.5V and 1.5V were effective. In FIG. 7, with a materially greater than zero ampere current over the driven windings, the thresholds need to be 0V and 3V. FIG. 7 is just one exemplary illustration of current greater than zero. As the current varies, the $U_D$ wave changes shape, although it does not change periodicity.

As such, the motor controller 112 may be programmed to modify the threshold as a function of current through the driven windings or it may modify the representation of the demodulated voltage in the undriven winding (e.g., $U_D$) as a function of current. As illustrated in FIG. 6 relative to FIG. 5, it can be seen that a modifier of approximately +1.5V could be added to the upper and lower thresholds to commutate $U_D$ in the proper location or the $U_D$ signal could be modified by subtracting approximately 1.5V to better calibrate the demodulated voltage to the thresholds. As can be seen, the modified thresholds are intersected by the original $U_D$ at rotational angle 1.25 and 1.75. Similarly, the modified $U_D$ intersect the original thresholds at rotational angle 1.25 and 1.75. Another variation on this concept may involve modifying both the $U_D$ and the thresholds concurrently.

The modifications to the thresholds and/or the demodulated voltage signals may be more complex than this simple example to identify proper commutation points. The upper and lower thresholds may be modified by different values and may be shifted in opposite (positive/negative) directions. Modifications to the $U_D$ wave may include scaling and/or modifying the slope of the wave. Modifications to the $U_D$ waveform and/or the thresholds may be made as a function of current through the driven phases, as retrieved by the current sense circuit or model, or as a function of the voltage source $V_{pwr}$ pulse width modulation signal.

Figure 8:
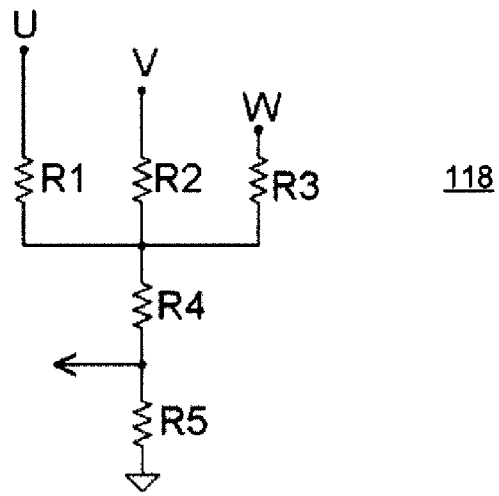
FIG. 8 is an illustration of an exemplary voltage sense circuit that may be used in conjunction with the motor control system in FIG. 4, in accordance with the exemplary to embodiment of the present disclosure.

FIG. 8 is an exemplary voltage sense circuit 118 that may be used in conjunction with the motor control system 110 in FIG. 4, in accordance with the exemplary embodiment of the present disclosure. The voltage sense circuit 118 is placed in the feedback path of a first control loop, between the power stage outputs 116 and the controller unit signal acquisition device 166. The voltage sense circuit 118 includes a resistor network comprising resistors R1, R2, R3, R4, and R5 coupled together as shown in FIG. 8. Voltage sense circuit 118 has three inputs connected to three motor terminals, U 36, V 40, W 38. The voltage sense circuit 118 superposes motor voltage response from each phase 36, 38, 40 and divides the result to level in accordance with input requirements with signal acquisition 166. The result includes the voltage on the undriven phase. While similar motor control configurations include voltage sense circuits 118, these circuits are directed to retrieving a back EMF signal and regularly filtering out the undriven phase voltage to get a cleaner back EMF signal.

Figure 9:
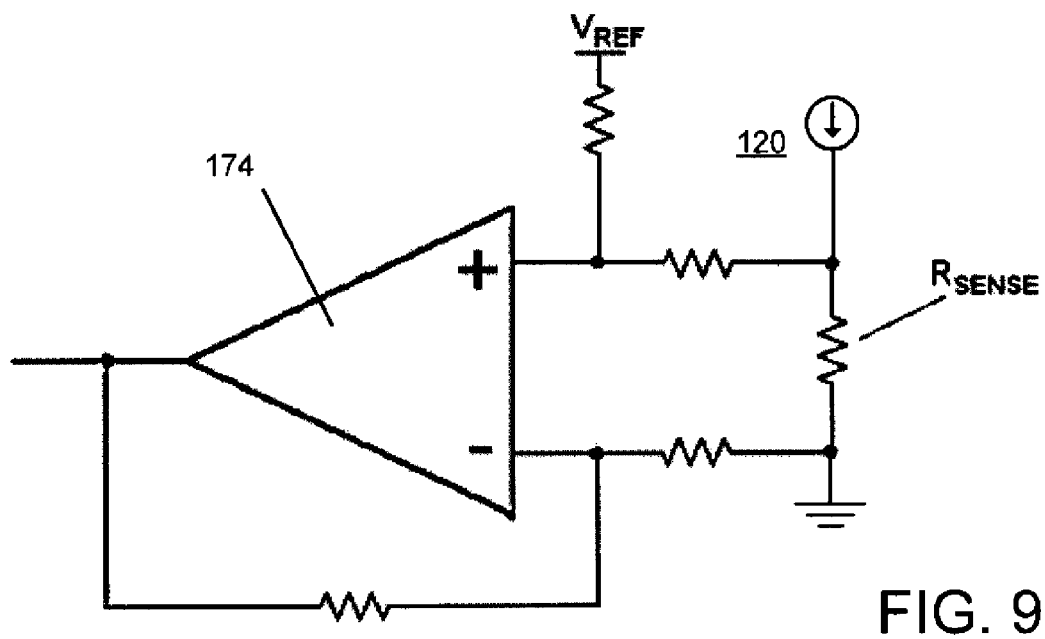
FIG. 9 is an illustration of an exemplary current sense circuit that may be used in conjunction with the motor control system in FIG. 4, in accordance with the exemplary embodiment of the present disclosure.

FIG. 9 is an exemplary current sense circuit 120 that may be used in conjunction with the motor control system 110 in FIG. 4, in accordance with the exemplary embodiment of the present disclosure. The current sense circuit 120 is placed in the feedback path of a second control loop, between a current sense resistor $R_{SENSE}$ and the controller unit signal acquisition device 166. The power supply voltage levels of current sense circuit 120 and controller unit 160 are approximately the same. Current sense circuit 120 includes an amplifier 174 configured for differential measurement of voltage across $R_{SENSE}$, as shown in FIG. 4. The amplifier 174 input common-mode voltage and gain are set such that amplifier output is at approximately mid-supply to facilitate monitoring of $R_{SENSE}$ current flowing in positive and negative direction.

Figure 10:
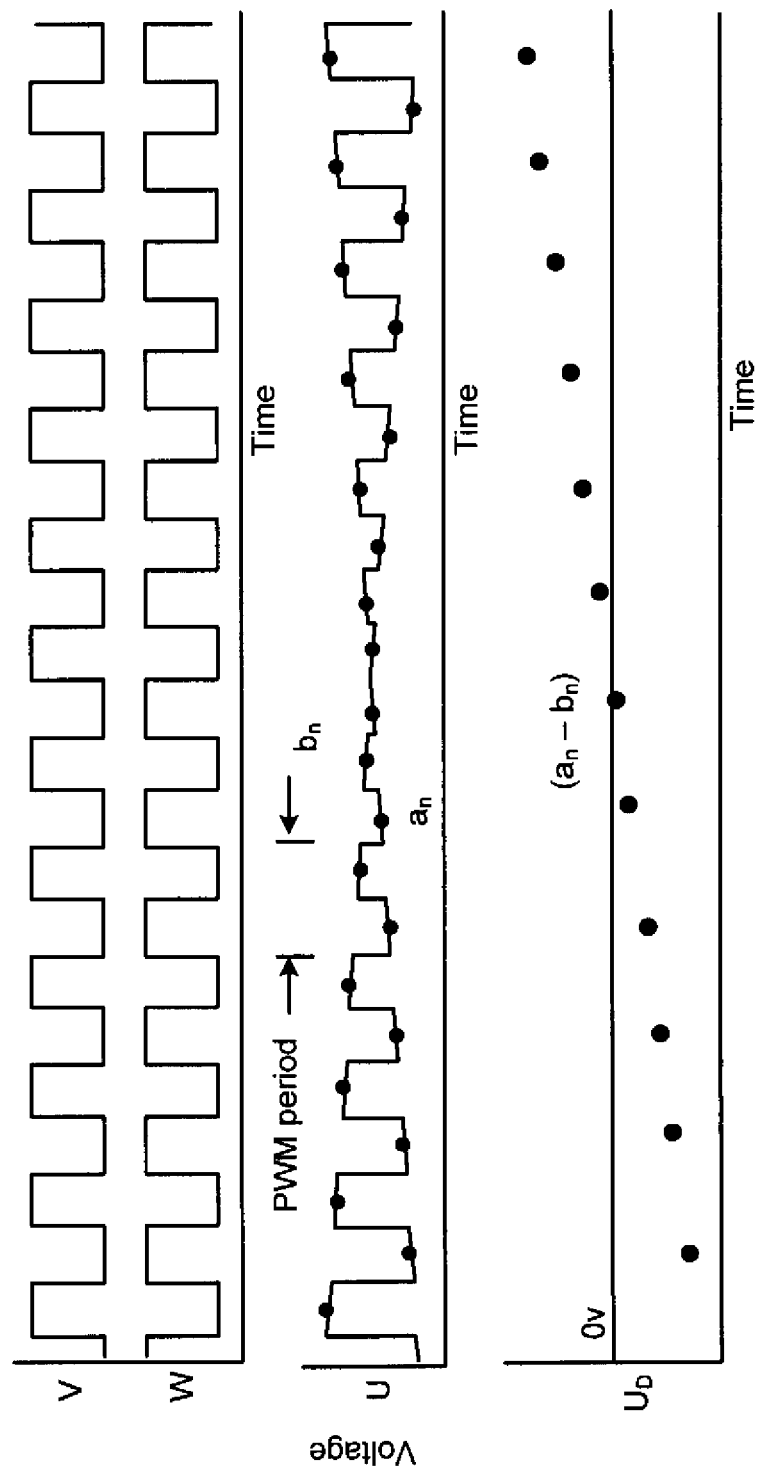
FIG. 10 is an illustration of the demodulated undriven phase signal associated with the motor control system of FIG. 4, in accordance with the exemplary embodiment of the present disclosure.

The motor control system 110 may be used to control a motor 30, such as the motor 30 illustrated in FIG. 2. FIG. 10 is an illustration of the demodulated undriven phase signal associated with the motor control system 110, in accordance with the exemplary embodiment of the present disclosure. Signals V and W are driven signals on two terminals of the motor 30. FIG. 10 illustrates a 50% duty cycle PWM with complementary drive. The drive phase voltage will normally be a value between ground and the power supply voltage. Typical switching frequencies are in the range of 1 kHz to 25 Khz, depending on motor size and construction as well as other factors. The signal at the undriven phase is shown in FIG. 10 as signal U. Signal U changes as a function of rotor position which varies the magnetic fields in the stator. The demodulated undriven phase signal $U_D$ is derived by measuring the voltage difference on signal U between the high $b_n$ and Iowa$_n$level, which constitutes demodulation. This demodulated signal is compared with an established threshold, such as the threshold shown in FIG. 5, and used to determine the commutation breakpoint where the power stage output will switch to a next winding pair to drive. The illustration of $U_D$ in FIG. 10 is analogous to the 1.25-1.75 rotor angle portion of the $U_D$ curve in FIG. 5.

Figure 11:
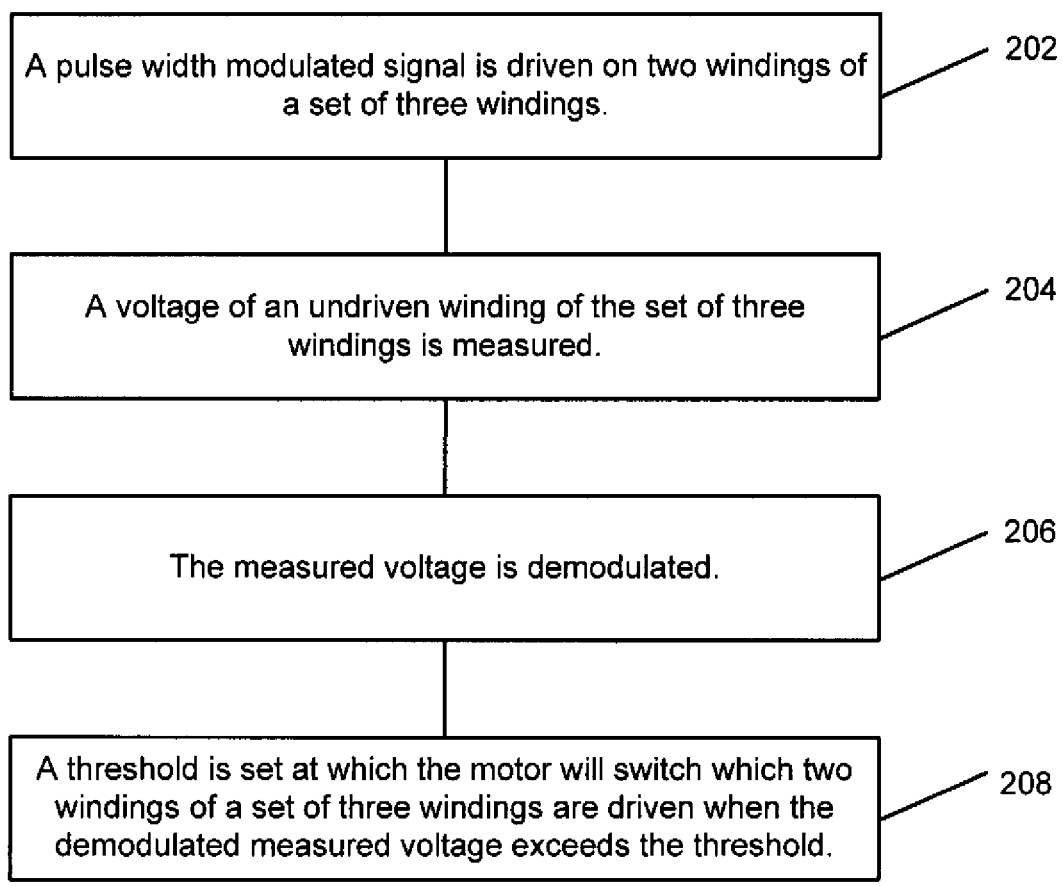
FIG. 11 is an illustration of a flowchart illustrating a method of using the motor control system 110 of FIG. 4, in accordance with the exemplary embodiment of the present disclosure.

FIG. 11 is an illustration of a flowchart illustrating a method 200 of controlling motor switching in a sensorless BLOC motor using the motor control system 110 of FIG. 4, in accordance with the exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown in FIG. 11, a demodulated measured voltage on an undriven winding is obtained. The demodulated measured voltage may be obtained by driving a pulse width modulated signal on the two windings of a set of three windings (block 202), measuring a voltage of the undriven winding of the set of three windings (block 204), and demodulating the measured voltage (block 206). A threshold is set at which the motor will switch which two windings of a set of three windings are driven when the demodulated measured voltage exceeds the threshold (block 208).

The undriven phase voltage may be measured with the voltage sense circuit 118 and demodulated as illustrated in FIG. 10. When the demodulated measured voltage exceeds this threshold, the motor will switch which two windings of a set of three windings are driven. This process can be repeated at a later time to update the thresholds. In one embodiment, this process of setting the threshold is run when the motor is initiated for use by a user and repeated until the rotor speed is sufficient to calculate rotor position based on back EMF, as is known in the art. Similarly, if during is operation the rotor is operating at a speed at which back EMF is used for rotor position calculating and then slows to a level where back EMF is no longer effective, this threshold setting process may be repeated. By setting the threshold on-the-fly, the system is able to account for varying motor characteristics and operating conditions that are present at initiation and evolve during usage.

As described herein, motors, such as those for electric scooters, can have varying initial torque applied to the motor. For instance, the torque placed on a motor for an electric scooter may be dependent on the amount of weight on the electric scooter and whether the scooter is facing an incline, a decline, or on a level surface. Thus, it is useful at start-up to obtain the demodulated measured voltage when the motor is initiated to apply torque. More particularly, it is useful at every initiation of the motor to obtain the demodulated measured voltage before applying torque with the motor. The process can take a short amount of time that may, for instance, be only a matter of seconds at initiation by the user before the motor begins applying torque, allowing the motor controller to collect information in real-time that significantly quells jitter from the motor for a better user experience.

An initial pulse width modulation signal is provided from the power source $V_{pwr}$ to apply a near-zero current to the driven windings, which will provide a demodulated measured voltage that allows the motor controller to calculate a near-zero commutation threshold. By maintaining a low drive current, the motor controller can run through the 6-step commutation sequence without significantly moving the rotor. For instance, looking at FIG. 5, it can be seen that a $U_D$ value of approximately 2.5V in combination with a $V_D$ value of approximately 0V and a $W_D$ value of approximately –2.5V for this particular is motor configuration indicates the rotor angle position is approximately 2.0, a position from which commutation sequence step 1 would provide the most initial torque.

Another pulse width modulation signal may be provided from the power source $V_{pwr}$ to apply a materially-greater-than-zero current to the driven windings, which will provide a demodulated measured voltage that allows the motor controller to calculate a current effect on the demodulated measured voltage. The pulse width modulation signal may have a 50% duty cycle. When the current is materially-greater-than-zero, prolonged application of the current may be expected to apply torque to the rotor. To achieve the initial calibration with minimal rotor movement, it is useful to apply a limited number of cycles of the pulse width modulation signal for each commutation sequence step. Looking at FIG. 6, it can be seen that a $U_D$ value of approximately 4V in combination with a $V_D$ value of approximately 0V and a WD value of approximately –1.6V for this particular motor configuration indicates the rotor angle position is approximately 2.0. More to the point, the motor controller can calibrate an impact of the current in the driven windings on the motor.

At initiation, while collecting information and calibrating the coefficients to account for a materially-greater-than-zero current, it is believed the user will be more comfortable if the rotor (and therefore, the scooter, drill bit, or similar motor driven ro product) remains stationary. Keeping a low current and limiting the duration of the pulse width modulation signal from the power source $V_{pwr}$ will be useful in achieving this goal. Further, as proceeding through the commutation sequence steps sequentially is a means to drive the rotor, so it may be useful to proceed through the commutation sequence steps non-sequentially to minimize driving the rotor. Proceeding through the commutation sequence steps in the order of 0, 3, 1, 4, 2, 5, for instance, may help minimize rotor movement and/or keep rotation of the rotor below one mechanical rotation. Applying a mechanical force to impede rotor rotation during the initiation phase may also be desirable for the satisfaction of the user.

One of the purposes of this real-time calibration may be calculating commutation thresholds. FIG. 5 illustrates the demodulated measured voltage for commutation steps 0, 1, and 2 for an exemplary motor. The demodulated measured voltage for commutation steps 3, 4, and 5 at near-zero current is expected to be the inverse of the demodulated measured voltage for commutation steps 0, 1, and 2, respectively. A positive commutation threshold for the near-zero current may be calculated as approximately a square root of the sum of the squares of the demodulated measured voltages and the negative commutation threshold may be the negative of the positive commutation threshold. The initiation sequence for the materially-greater-than-zero current may be used to calibrate a compensation model based on a current through the driven windings, wherein the compensation model modifies the threshold.

After initiation, the user will begin using the motor, which will inherently include rotating the rotor. When the rotor is rotating fast enough to get a clean back EMF signal, commutation may be calculated from the back EMF. When the rotor is rotating at a speed below which back EMF is usable for sextant identification, the motor controller may continue obtaining the demodulated measured voltage and calibrating the compensation model as a function of the current in the driven windings and/or the pulse width modulation signal. The continually or repeatedly calibrated compensation model may be used to adjust the threshold or demodulated measured voltage data to improve commutation point identification. Proper commutation point identification insures the proper commutation sequence step is utilized to maximize available torque in the desired rotational direction.

The step of changing which two windings are driven may involve changing which phases are driven after the demodulated measured voltage has exceeded the threshold for a set period of time. The undriven voltage signal may experience noise, and that noise may cause the threshold to be surpassed prematurely and temporarily. Verifying that the demodulated measured voltage continues to exceed the threshold for a period of time diminishes the possibility that the threshold is surpassed as a result of noise instead of properly identified rotor position.

The threshold may be set as a function of the pulse width modulated signal. For instance, as an amplitude of the pulse width modulation signal VPWR increases, the absolute value of the thresholds should increase to properly compensate for the undriven winding voltage also increasing in value. The threshold may be predetermined and modified as a function of a characteristic of the pulse width modulated signal. Similarly, the demodulated measured voltage value may be modified within the motor controller as a function of the pulse width modulated signal to allow the demodulated measured voltage value to intersect the threshold at the proper rotor rotation angles. The demodulated measured voltage may be modified by scaling the demodulated measured voltage.

While the pulse width modulation signal can be useful to project ways to modify the thresholds or the demodulated measured voltage, another value that can be useful is the current over the driven windings. The motor controller can use the current sense circuit to identify the current value over the driven windings. The demodulated measured voltage can be modified as a function of the current through the driven windings. The threshold can be modified as a function of the current through the driven windings.

The demodulated measured voltage or the threshold can be modified using a compensation model based on at least one of a characteristic of the motor and an operating condition of the motor. The compensation model can be, for example, a polynomial, a spline, a logarithmic curve or trigonometric model. The characteristic of the motor may include resistance, inductance, back EMF constant, saliency, inertia, frictional losses, eddy current and hysteresis losses, and magnet material properties. The operating condition of the motor may include current in the driven phases (which can be measured or modeled), voltage applied to the stator, temperature, torque, and speed. Each sextant may be associated with a different compensation model.

First Exemplary Commutation Breakpoint Calculation

A pulse width modulation signal is provided to two windings at a level that provides a near zero average current ($I_{min}$) over the two windings. A first set of voltage data representing the motor voltage response signal on the undriven phase 36, spanning at least an entire sextant, is obtained. A first set of current data representing the driven phase current is collected corresponding to each data point in the first set of undriven voltage data. The process is repeated with a pulse width modulation signal that provides a mid-level drive phase current (a.k.a. $I_{mid}$) and again with a pulse width modulation signal that provides an approximately maximum drive phase current (a.k.a. Imax).

A first set of coefficients representing the influence of mid-level values of current is calculated based on first and second current data sets.

$$\text{Coeff}_{midCurrent} = (V_{MTR}(I_{mid}) - V_{MTR}(I_{min}))/(I_{mid} - I_{min})$$

Where VMTR is the demodulated motor voltage response signal based on the undriven phase 36.

A second set of coefficients representing the influence of max-level values of current is calculated based on first and third current data sets $$\text{Coeff}_{maxCurrent} = (V_{MTR}(I_{max}) - V_{MTR}(I_{min}))/(I_{max} - I_{min})$$

The effect of current on the commutation signal is different in odd sextants compared to even sextants. Therefore, said first and second sets of coefficients are created for both even and odd sextants.

$\text{Coeff}_{midCurrent}$(odd)
$\text{Coeff}_{midCurrent}$(even)
$\text{Coeff}_{maxCurrent}$(odd)
$\text{Coeff}_{maxCurrent}$(even)

The resultant coefficient values can be used as-is under specific conditions. For example, if an application runs at specific currents because the motor drives known loads, then the coefficients can be stored in a lookup table. At each operating current level, the coefficients can then be read from the table and used to compensate the undriven phase signal for that current.

Another method of modifying the threshold and/or demodulated voltage includes transforming the resultant coefficient values into slope and intercept values for even and odd sextants, which can then be generally applied for a wide set of current values. The Slope and Intercept values are stored in memory.

The coefficient as a function of current is calculated as:

$$\text{Coefficient}(I) = \text{Slope} * I_{avg} + \text{Intercept}$$

In this equation, $I_{avg}$ is the average driven phase current, obtained in this example via amplifier 174 in difference configuration monitoring low side shunt resistor and generally described as current sense block in FIG. 4 and FIG. 9. The amplifier output is sampled and digitized in both the on and off portions of the PWM cycle. The values are digitally processed to produce the average motor phase current in the PWM cycle. The Slope and Intercept values may be obtained from memory device 162. Sextant parity determines whether Slope and Intercept data for odd or even sextants is used.

Slope is effectively calculated as $\Delta V/\Delta I$; hence, Coefficient (I) has units of resistance.

A correction factor as a function of current is then calculated as:

$$VCF(I) = I_{avg} * \text{Coefficient}(I)$$

Controller unit memory device 162 contains constant values representing motor characteristics. Constant value(s) for commutation breakpoint is stored in memory device 162. Slope and intercept values are stored in memory device 162.

Processing unit 164 performs arithmetic calculations based on stored and measured data. Specifically, the correction factor, VCF(I), is calculated and the motor voltage response on the undriven phase is demodulated. The processing unit 164 inverts the polarity of the demodulated signal in every other sextant such that the slope of the demodulated signal with respect to the direction of the applied torque is positively, independent of the sextant. The processing unit 164 modifies the demodulated signal with the correction factor in accordance with the winding current. The processing unit 164 calculates direction of the demodulated signal based on its slope between commutation breakpoints, thereby confirming direction of rotation. A difference between first and second demodulated signal data points taken between consecutive commutation breakpoints is compared to a threshold value. A difference value greater than the threshold value indicates positive slope, while a difference value less than the threshold value indicates negative slope. The definition of slope by way of comparison to a threshold value is arbitrary. For example, a difference value less than a threshold value could just as well define a positive slope.

The processing unit 164 compares a modified/corrected demodulated signal to a stored forward commutation breakpoint. At least one occurrence of the combination of a modified demodulated signal having value greater than the forward commutation breakpoint value and confirmed forward direction of rotation results in the processing unit 164 controlling the control signal 112 to commutate the power stage 116 to a next phase pair. Requiring multiple occurrences of the satisfying condition prior to to commutating may increase system robustness. The processing unit 164 compares a modified/corrected demodulated signal to a stored reverse commutation breakpoint. At least one occurrence of the combination of a modified demodulated signal having value less than the reverse commutation breakpoint value and confirmed reverse direction of rotation results in processing unit 164 controlling PWM 112 to commutate the power stage 116 to a previous phase pair. Requiring multiple occurrences of the satisfying condition prior to commutating may increase system robustness.

An average current across the driven windings can be acquired a number of ways, including measurement and modeling, some of which are known to those skilled in the art. One useful method for obtaining the current across the driven windings is averaging a current measured by an analog to digital converter and a current sense mechanism. As is discussed above, the average current is used to modify at least one of the thresholds and the demodulated measured voltage.

When the rotor rotates fast enough, relative to other motor characteristics and operating conditions, a reliable back EMF signal becomes available. Use of a reliable back EMF signal to control commutation from driven pair to driven pair is well known in the art. Thus, the techniques disclosed herein are designed for controlling commutation when the rotor is not moving or is rotating at speeds below which a reliable back EMF signal is available. The motor control switches to the back EMF commutation technique when a rotational speed of the rotor surpasses a speed threshold such that the reliable back EMF signal is available.

It should be emphasized that the above-described embodiments of the present disclosure, particularly, any "preferred" embodiments, are merely possible examples of implementations, merely set forth for a clear understanding of the principles of the disclosed system and method. Many variations and modifications may be made to the above-described embodiments of the disclosure without departing substantially from the spirit and principles of the disclosure. All such modifications and variations are intended to be included herein within the scope of this disclosure and protected by the following claims.

What is claimed is:

1. Method of controlling motor switching in a sensorless BLDC motor, the method comprising the steps of:
   obtaining a demodulated measured voltage on an undriven winding; and
   setting a threshold at which the motor will switch which two windings of a set of three windings are driven when the demodulated measured voltage exceeds the threshold.

2. The method of claim 1, wherein obtaining the demodulated measured voltage on the undriven phase further comprises modeling the motor.

3. The method of claim 1, wherein obtaining the demodulated measured voltage on the undriven phase further comprises:
   driving a pulse width modulated signal on the two windings of a set of three windings;
   measuring a voltage of the undriven winding of the set of three windings; and
   demodulating the measured voltage.

4. The method of claim 3, wherein obtaining the demodulated measured voltage further comprises obtaining the demodulated measured voltage when the motor is initiated to apply torque.

5. The method of claim 3, wherein obtaining the demodulated measured voltage further comprises obtaining the demodulated measured voltage at each instance in which the motor is initiated to apply torque.

6. The method of claim 3, wherein obtaining the demodulated measured voltage further comprises obtaining the demodulated measured voltage in real-time while the motor is in use by the user.

7. The method of claim 3, wherein obtaining the demodulated measured voltage further comprises obtaining the demodulated measured voltage while the rotor remains substantially stationary.

8. The method of claim 7, wherein the set of windings are applying approximately zero torque to the rotor.

9. The method of claim 3, wherein the demodulated measured voltage is obtained for up to a set of six sextants, and wherein non-successive sextants are driven to obtain the demodulated measured voltages.

10. The method of claim 9, wherein the demodulated measured voltage is obtained for a set of six sextants and the threshold is calculated as approximately a square root of the sum of the squares of the demodulated measured voltages.

11. The method of claim 3, further comprising calibrating a compensation model based on a current through the two windings, wherein the compensation model modifies the demodulated measured voltage.

12. The method of claim 11, wherein the demodulated measured voltage is obtained for at least one sextant with at least two different current magnitudes through the two windings.

13. The method of claim 3, further comprising calibrating a compensation model based on a current through the two windings, wherein the compensation model modifies the threshold.

14. The method of claim 3, wherein the pulse width modulation signal has a 50% duty cycle.

15. The method of claim 3, wherein obtaining the demodulated measured voltage further comprises obtaining the demodulated measured voltage while the rotor rotates at a speed below which back EMF is usable for sextant identification.

16. The method of claim 15, further comprising calibrating a compensation model based on a current through the two windings, wherein the compensation model modifies the demodulated measured voltage.

17. The method of claim 15, further comprising calibrating a compensation model based on a current through the two windings, wherein the compensation model modifies the threshold.

18. The method of claim 3, further comprising identifying a winding pair to drive to maximize available torque in the desired rotational direction.

19. The method of claim 1, wherein the motor is a three-phase permanent magnet motor.

20. A system for controlling motor switching in a sensorless BLDG motor, the motor comprising a stator with three stator windings and a permanent magnet rotor, the system comprising:
   a controller unit comprising a control signal generator, a memory device, a processing unit, a signal acquisition device, and an analog-to-digital converter;
   a power stage having a plurality of switches, wherein the power stage receives a control signal from the control signal generator and a power signal from a power source, wherein the power stage drives two windings of the three stator windings and leaves one stator of the three stator windings undriven;
   wherein the processing unit acquires a demodulated measured voltage on the undriven winding; and
   wherein the processing unit calculates a threshold at which the power stage will change which two windings of the three stator windings are driven when the demodulated measured voltage surpasses the threshold.

21. The system of claim 20, wherein the controller unit is attached to the motor.

22. The system of claim 20, further comprising a compensation model stored in the motor memory, wherein the compensation model modifies at least one of the threshold and the demodulated measured voltage as a function of at least one of a motor characteristic and an operating condition.

23. The system of claim 20, further comprising a brake holding the rotor in a substantially stationary position while the power stage drives the two windings.

24. The system of claim 20, wherein the controller unit is programmed on initiation to commutate the driven windings in non-sequential order until the threshold is calculated, thereby minimizing movement of the rotor during motor initiation.

* * * * *

UNITED STATES PATENT AND TRADEMARK OFFICE
CERTIFICATE OF CORRECTION

PATENT NO.         : 9,088,237 B2
APPLICATION NO.    : 13/827848
DATED              : July 21, 2015
INVENTOR(S)        : Sanchez et al.

Page 1 of 1

It is certified that error appears in the above-identified patent and that said Letters Patent is hereby corrected as shown below:

In the Claims

Col. 14, Claim 20, Line 30, "BLDG" should be -- BLDC --.

Signed and Sealed this
Twenty-second Day of December, 2015

Michelle K. Lee
*Director of the United States Patent and Trademark Office*